United States Patent
Klinkner et al.

(10) Patent No.: US 7,343,529 B1
(45) Date of Patent: Mar. 11, 2008

(54) AUTOMATIC ERROR AND CORRECTIVE ACTION REPORTING SYSTEM FOR A NETWORK STORAGE APPLIANCE

(75) Inventors: Steven R. Klinkner, Fremont, CA (US); Jay B. Perry, San Jose, CA (US); Larry R. Lancaster, Jr., Santa Clara, CA (US); Scott A. Schoenthal, Dublin, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 280 days.

(21) Appl. No.: 10/953,146

(22) Filed: Sep. 28, 2004

Related U.S. Application Data

(63) Continuation-in-part of application No. 10/836,936, filed on Apr. 30, 2004, now abandoned.

(51) Int. Cl.
*G06F 11/00* (2006.01)
(52) U.S. Cl. ............... 714/57; 714/38; 714/4; 707/206
(58) Field of Classification Search ............ 714/57
See application file for complete search history.

(56) References Cited

U.S. PATENT DOCUMENTS

| | | | |
|---|---|---|---|
| 4,937,763 A | 6/1990 | Mott | |
| 5,010,551 A * | 4/1991 | Goldsmith et al. | 714/46 |
| 5,067,099 A | 11/1991 | McCown et al. | |
| 5,107,500 A | 4/1992 | Wakamoto et al. | |
| 5,287,505 A | 2/1994 | Calvert | |
| 5,377,196 A | 12/1994 | Godlew et al. | |
| 5,463,642 A | 10/1995 | Gibbs et al. | |
| 5,621,663 A | 4/1997 | Skagerling | |

(Continued)

FOREIGN PATENT DOCUMENTS

EP 0306244 3/1989

(Continued)

OTHER PUBLICATIONS

Chandra et al. "Whither generic recovery from application faults? A fault study using open source software." Dependable Systems and Networks, 2000. DSN 2000. Proceedings International Conference on New York, NY, USA Jun. 25-28, 2000, Los Alamitos, CA, USA, IEEE Coput. Soc., US, Jun. 25, 2000, pp. 97-106.

(Continued)

*Primary Examiner*—Christopher McCarthy
(74) *Attorney, Agent, or Firm*—Blakely Sokoloff Taylor & Zafman LLP

(57) ABSTRACT

A computer system is coupled to a remote service provider over a network. The computer system, in response to certain events, may generate an error package, which is transmitted to the remote service provider over the network. The error package includes system logs and may include other pertinent data. The remote service provider receives and unbundles the package, and analyzes the system logs. If it is determined that an error is present, an annotated log is returned to the computer system, and a user is prompted with the corrective action. According to another embodiment of the invention, an error catalog is generated and incorporated into the source code of the operating system of the computer system.

24 Claims, 6 Drawing Sheets

U.S. PATENT DOCUMENTS

| | | | |
|---|---|---|---|
| 5,627,842 A | | 5/1997 | Brown et al. |
| 5,742,754 A | * | 4/1998 | Tse .............................. 714/38 |
| 5,748,880 A | * | 5/1998 | Ito et al. ....................... 714/46 |
| 5,761,407 A | | 6/1998 | Benson et al. |
| 5,790,780 A | * | 8/1998 | Brichta et al. ................ 714/46 |
| 5,826,008 A | * | 10/1998 | Bluvband ..................... 714/57 |
| 5,862,322 A | * | 1/1999 | Anglin et al. ................. 714/57 |
| 5,892,898 A | * | 4/1999 | Fujii et al. .................... 714/57 |
| 5,983,364 A | | 11/1999 | Bortcosh et al. |
| 6,021,262 A | * | 2/2000 | Cote et al. .................... 714/48 |
| 6,023,507 A | * | 2/2000 | Wookey ...................... 709/224 |
| 6,073,255 A | | 6/2000 | Nouri et al. |
| 6,145,096 A | | 11/2000 | Bereiter |
| 6,167,358 A | | 12/2000 | Othmer |
| 6,202,207 B1 | | 3/2001 | Donohue |
| 6,282,701 B1 | | 8/2001 | Wygodny et al. |
| 6,298,457 B1 | * | 10/2001 | Rachlin et al. ............... 714/49 |
| 6,477,667 B1 | * | 11/2002 | Levi et al. .................... 714/57 |
| 6,477,703 B1 | | 11/2002 | Smith et al. |
| 6,526,529 B1 | * | 2/2003 | Miksovsky et al. .......... 714/57 |
| 6,539,499 B1 | | 3/2003 | Stedman et al. |
| 6,553,507 B1 | | 4/2003 | Cohen |
| 6,629,267 B1 | * | 9/2003 | Glerum et al. ................ 714/38 |
| 6,634,000 B1 | * | 10/2003 | Jammu et al. ................ 714/37 |
| 6,654,915 B1 | * | 11/2003 | Lu et al. ....................... 714/57 |
| 6,681,344 B1 | | 1/2004 | Andrew |
| 6,725,398 B1 | * | 4/2004 | Varma et al. ................. 714/25 |
| 6,742,141 B1 | * | 5/2004 | Miller .......................... 714/26 |
| 6,751,758 B1 | * | 6/2004 | Alipui et al. ................. 714/54 |
| 6,757,837 B1 | * | 6/2004 | Platt et al. .................... 714/4 |
| 6,799,277 B2 | * | 9/2004 | Colvin ......................... 726/22 |
| 6,944,659 B2 | * | 9/2005 | Taggart et al. ............... 709/224 |
| 7,007,200 B2 | | 2/2006 | Salem |
| 7,013,410 B2 | * | 3/2006 | Asauchi ....................... 714/46 |
| 7,017,085 B2 | * | 3/2006 | Braun .......................... 714/47 |
| 7,031,981 B1 | * | 4/2006 | DeLuca et al. ............. 707/104.1 |
| 7,051,243 B2 | | 5/2006 | Helgren |
| 7,058,860 B2 | * | 6/2006 | Miller et al. ................. 714/47 |
| 7,069,480 B1 | * | 6/2006 | Lovy et al. ................... 714/57 |
| 7,080,287 B2 | | 7/2006 | Salem |
| 7,100,085 B2 | * | 8/2006 | Miller .......................... 714/26 |
| 7,124,060 B1 | * | 10/2006 | Eriksson et al. ............. 702/185 |
| 7,206,968 B2 | * | 4/2007 | Vollmar et al. ............... 714/26 |
| 2004/0025077 A1 | * | 2/2004 | Salem ........................... 714/2 |
| 2004/0148389 A1 | * | 7/2004 | Satomi et al. ............... 709/224 |
| 2004/0153823 A1 | * | 8/2004 | Ansari ......................... 714/38 |
| 2005/0172162 A1 | | 8/2005 | Takahashi |
| 2007/0006014 A1 | * | 1/2007 | Huang ........................... 714/2 |

FOREIGN PATENT DOCUMENTS

| | | |
|---|---|---|
| EP | 0537098 | 4/1993 |
| WO | WO 93/00632 | 1/1993 |
| WO | WO 02/21281 | 3/2002 |

OTHER PUBLICATIONS

IBM. "automated problem reporting." IBM Technical Disclosure Bulletin, vol. 32, No. 6a, Nov. 1989, pp. 466-468.

Kegel et al. "Apache Problem Report Database." May 24, 1999, downloaded from http://bugs.apache.org/, Jul. 16, 2003, 4 pages.

Slashdot, "Tux2: The Filesystem That Would Be King," Oct. 17, 2000, downloaded from http://slashdot.org/features/00/10/13/2117258.shtml, Feb. 13, 2007, 16 pages.

* cited by examiner

400

| | | |
|---|---|---|
| 402 | event-definitions | name="asup.general.drop"<br>severity="SVC_ERROR" |
| 404 | event-def description | This event is generated when the system has exhausted IPC resources (sk messages.) This is an internal error that may indicate that the autosupport processing is blocked and is unable to write to disk or the network. |
| 406 | param | Autosupport message title |
| 408 | corrective-action | If this problem persists over a long period of time, and the cause is not readily identifiable as being external to the appliance, a reboot may be required to clear the problem. If a reboot becomes necessary, NetApp Customer Support to take a core dump for offline analysis. |
| 410 | Syslog | severity = "LOG_INFO" facility = "LOG_DAEMON" |
| 412 | snmp | Enterprise-trap specific-type="134" |
| 414 | format | Out of messages for autosupport, skipping autosupport: %s |

FIG. 4

AUTOMATIC ERROR AND CORRECTIVE ACTION REPORTING SYSTEM FOR A NETWORK STORAGE APPLIANCE

This application is a continuation in part of parent patent application Ser. No. 10/836,936 filed Apr. 30, 2004 now abandoned titled "Method For Handling Computer System Errors" and claims priority to this parent application. Parent Application Ser. No. 10/836,936 is hereby incorporated by reference.

FIELD OF THE INVENTION

The present invention relates generally to computer systems and specifically to handling errors encountered by computer systems.

BACKGROUND

Computer systems often encounter unexpected errors which must be resolved to continue normal functioning of the system. Errors typically encountered range from minor errors that may only affect a single subsystem to major errors that cause a computer system to cease operating. Generally, a computer system may encounter hardware or software errors. For example, a hardware error may be a drive malfunction, while a software error may be a driver misconfiguration or other malfunction that prevents the system from operating properly. Software errors can be encountered in many different types of software, including in the system's operating system (OS). Since the OS is required for the computer system to operate, OS errors can make a computer system unusable.

Computer systems often maintain log files that log activity on the system and which may include a list of errors encountered. The errors are typically listed according to an error name or identifier. A user can obtain more information about the error and potentially determine a remedy by consulting a manual or web page established by the developer of the software indicating the error. The user can then choose an action to remedy the encountered error.

One way for a developer to determine potential system errors is to monitor computer systems using their product and to track errors that users have encountered. This method is an example of a technique known as data mining. A software developer may mine errors encountered by several users. By examining the type of errors and the characteristics of a specific error, the developer can then determine the type and the seriousness of the error and develop a corrective action for it. Further, a series of independently generated errors may indicate a more fundamental problem with a hardware or software system. These data mining techniques are reactionary in nature, and as a result, a remedy may not be available to a user when an error is encountered.

The increasingly complex computer systems and software now being used may generate frequent and numerous system errors. It may become burdensome for a user to locate an error definition and remedy for every error encountered. What is needed is an improved system for error definition and handling.

SUMMARY OF THE INVENTION

The present invention includes a method for responding to an error. In the method, an error package is received from a system including a system log when an error occurs on the system. A description of the error and a corrective action for the error are determined from an error message catalog, and the description and the corrective action are presented to a user of the system.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which:

FIG. 4 illustrates an EMS event definition entry according to an embodiment of the invention;

DETAILED DESCRIPTION

Described herein are methods and apparatuses for a Method for Handling Computer System Errors. Note that in this description, references to "one embodiment" or "an embodiment" mean that the feature being referred to is included in at least one embodiment of the present invention. Further, separate references to "one embodiment" or "an embodiment" in this description do not necessarily refer to the same embodiment; however, such embodiments are also not mutually exclusive unless so stated, and except as will be readily apparent to those skilled in the art from the description. For example, a feature, structure, act, etc. described in one embodiment may also be included in other embodiments. Thus, the present invention can include a variety of combinations and/or integrations of the embodiments described herein.

According to an embodiment of the invention, an error catalog is incorporated into the source code of an operating system (OS). The error catalog includes error definitions generated by the developers of the OS at the time of development. A definition for each error is incorporated into the source code. After the source is built into object code, an error database may be created from the definitions included in the code. The database may then be exported to other information sources such as a database accessible over the Internet.

According to another embodiment of the invention, when a computer system encounters an error, the operating system generates an error package including system logs. The package is transmitted over a network to a remote service provider. The service provider unbundles the package, and analyzes the error message. Corrective actions are then extracted from the error catalog, and a preventive action is presented to the user. By automatically presenting the corrective action to the user, the user avoids having to determine the nature of the error and a proper corrective action.

Figure 1:
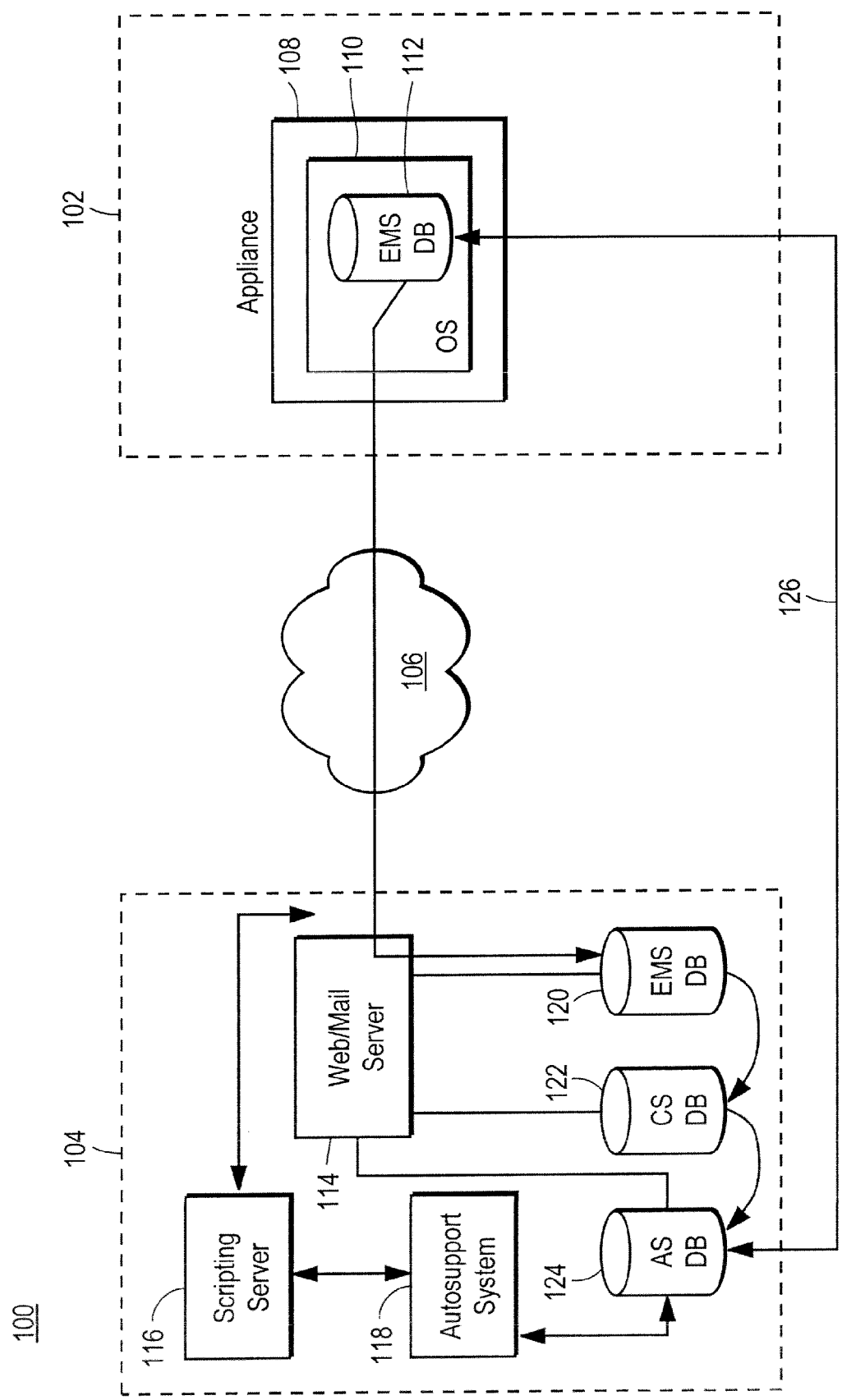
FIG. 1 illustrates a service relationship between a computer system and a remote service provider.

FIG. 1 illustrates a service relationship 100 between a computer system and a remote service provider. The relationship 100 comprises the computer system 102 and a remote service provider 104 communicating over a network 106. The network 106 may be any network including a wide area network (WAN) such as the Internet. The remote service provider 104 handles errors generated by the computer system 102. The remote service provider 104 may be able to maintain a more up to date version of corrective actions based upon other user's experiences. In an alternate embodiment, the computer system 102 and remote service provider 104 may be co-located, and the network 106 may be a memory-to-memory transfer.

The computer system 102 may include an appliance 108. For example, the appliance may be a filer, WebCache, etc. manufactured by Network Appliance of Sunnyvale, Calif. The appliance 108 includes an OS 110 such as the OnTap OS by Network Appliance. According to an embodiment of the invention, the OS 110 includes an event management system (EMS) database 112. The EMS database 112 is added to the source code of the OS 110 when the OS 110 is written. The EMS database 112 is derived from a catalog including definitions of errors that are anticipated by the authors of the OS 110, and may include descriptions and corrective actions. The EMS database 112 can be compared to annotated system logs sent to the computer system 102 in response to a request for support.

The service provider 104 provides support for the computer system 102. The service provider 104 may be remote to the computer system 102, accessible over the network 106. A user of the computer system 102 may enter into a support agreement with the system provider 104. The terms of the support agreement may stipulate that the service provider 104 will handle processing of errors when they occur on the computer system 102. The service provider 104 may then provide a description of and remedy for the error automatically when it occurs on the system 102. The remedy may be presented to a user, who can then decide whether to take the action.

The service provider 104 may include several servers and attached databases. A web/mail server 114 may include one or more servers that receive incoming error packages and distribute the packages to the scripting server 116. For example, the computer system 102 may send the package via the Hypertext Markup Language (HTML) or the Simple Mail Transfer Protocol (SMTP). The scripting server 116 handles the incoming error package from the computer system 102. The scripting server 116 unbundles the package, and analyzes its contents, according to one embodiment of the invention.

According to one embodiment of the invention, the EMS database 118 may be a copy of the EMS database 112 on the computer system 102. Alternatively, a separate database 118 may be maintained. The EMS database 118 is also coupled with a customer service database 120. The customer service database 120 includes general information and historical data relating to the specific computer system 102. The customer service database may, for example, include a historical list of errors that have previously occurred and actions previously taken on the computer system 102.

The present invention may implement an autosupport 118 system, which analyzes the computer system 102 using the scripting server 116. The autosupport system 118 can analyze errors that occur on the computer system 102 so that the system 102 is not burdened with that task. The autosupport system 118 may also be used to identify as of yet undetermined errors, and to develop fixes for those errors. The error handling in the relationship 100 is generally performed by the autosupport system.

The autosupport may be generated as a result of several different events. The autosupport package may be generated when there is a partial or total system failure. For example, a pre-defined list of partial failures, such as a disk failure or other hardware failure, may be maintained. Whenever one of these partial failures occurs, the autosupport package may be generated. This list may also be user-configurable. The autosupport package may also be generated according to a schedule. For example, an autosupport package may be generated once a week. The autosupport may also be invoked manually by a user. Other methods of invoking the system are also possible. These conditions may be used to determine when an autosupport package is generated. When the package is generated it is transmitted to the autosupport system 118 over the network 106.

Upon receipt of the autosupport package, the autosupport system 118 determines a corrective action based on a correlation between the EMS database 120 and the autosupport database 124. Once the corrective action is determined, a link between the customer service database 122 and the autosupport database 124 is established, and a direct notification 126 is issued to the customer. The direct notification 126 may include an autosupport package including an error definition and description, and a remedial action. A user may then decide to perform the remedial action, which has been proactively presented to him. In an alternative embodiment, the system may automatically perform the corrective action that has been provided to it in the direct notification 126.

The customer service database 122 may open a support case for each error encountered by the system 102. The customer service database 122 maintains these support cases so that the history of the system can be easily determined. If an error frequently recurs on a system 102, the autosupport system may be able to determine another solution that may permanently solve the problem.

The autosupport database 124 may contain data needed for processing support requests from the computer system 102. The autosupport database 124 also includes a listing of autosupport messages sent to various customers when errors occur. The autosupport database 124 can be used for data mining to improve error handling. Although the developers of the OS 110 will try to anticipate most potential errors, other errors may arise over time. The autosupport database 124 can be analyzed to determine corrective actions for these new errors which can be incorporated back into the autosupport database 124.

The scripting server 116 may also generate an annotated system log. System logs typically include a list of events that have occurred on the system 102. Current system logs typically include only the error identifier, which may or may not be descriptive. An annotated system log generated by the autosupport system and transmitted to the computer system 102 in an autosupport package.

Figure 2:
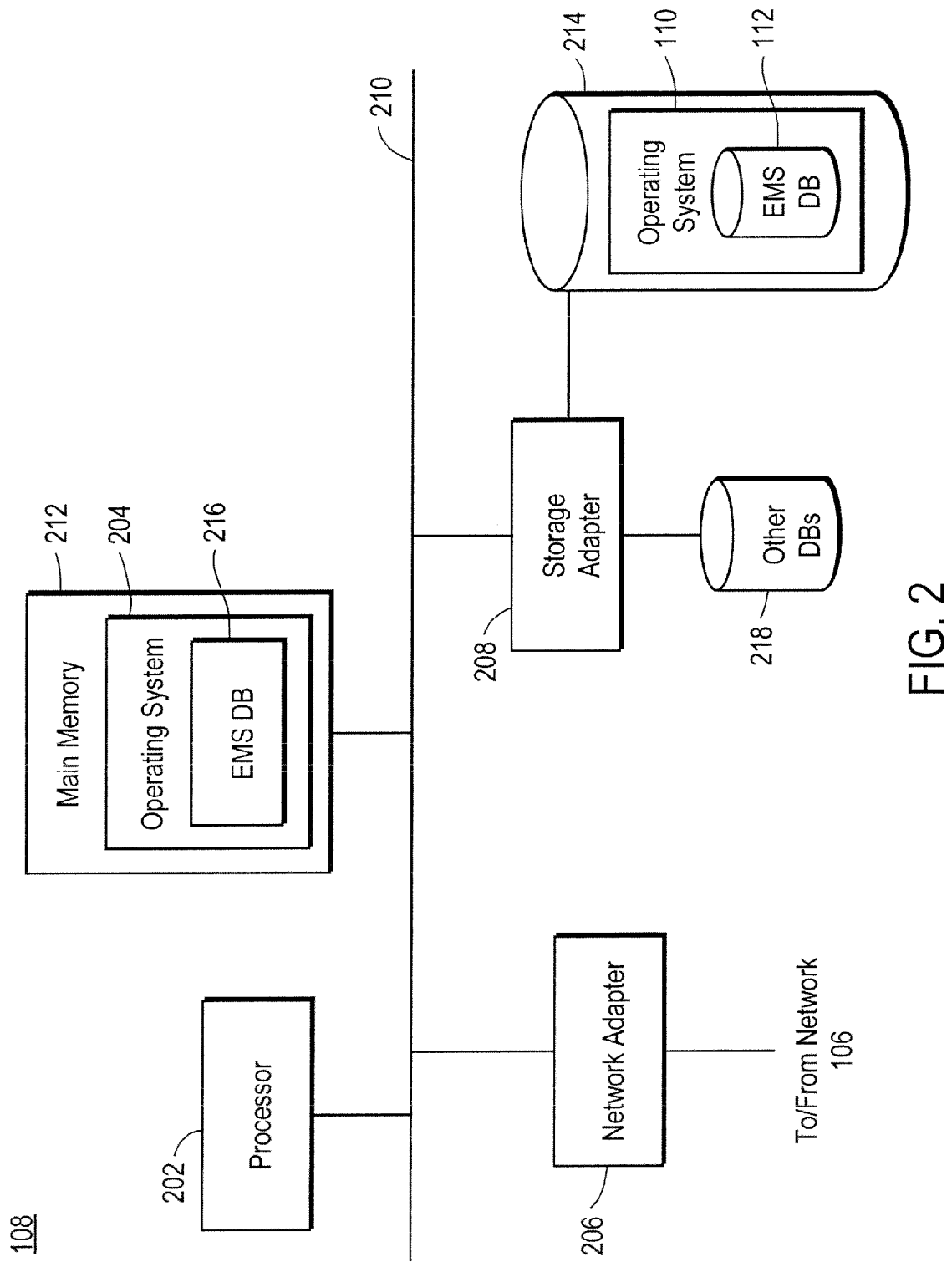
FIG. 2 illustrates a typical computer system on which an embodiment of the present invention may be implemented.

FIG. 2 illustrates a typical computer system on which an embodiment of the present invention may be implemented. According to an embodiment of the invention, the system 200 may be a network storage appliance. A network storage appliance is a special-purpose computer that provides file service relating to an organization for information on storage devices, such as disks. The network storage appliance, such as a file server, or filer, includes an operating system that implements a file system to logically organize the information as a hierarchical structure of directories and files on the disks. However, it is understood that any network attached or other computer system may be used according to the current invention.

The appliance 108 includes a processor 202, a memory 204, a network adapter 206, and a storage adapter 208. These components are linked through a bus 210. The appliance 108, as shown in FIG. 2, is typical of a network server or appliance, and it is understood that various different configurations may be used in its place. The processor 202 may be any appropriate microprocessor or central processing unit (CPU), such as those manufactured by Intel or Motorola. The memory 204 may include a main random access memory (RAM), as well as other memories including read only memories (ROM), flash memories, etc. A copy 212 of the operating system 110 is stored in the memory 204 while the appliance 108 is operating. As mentioned above, the operating system 110 may be the OnTap OS by Network Appliance, but may also be Microsoft Windows, the Macintosh OS, a Unix based OS, etc. An executable copy of the OS 110 is stored permanently on a storage device 214, which may be a magnetic or optical drive such as a hard drive or a compact disc read only memory (CD-ROM) drive. A copy 216 of the EMS database 112 may also be loaded into the main memory 204 at certain times. The storage adapter 208 allows the appliance 108 to communicate with the storage 214 and other external storage, such as the other databases 218.

Figure 3:
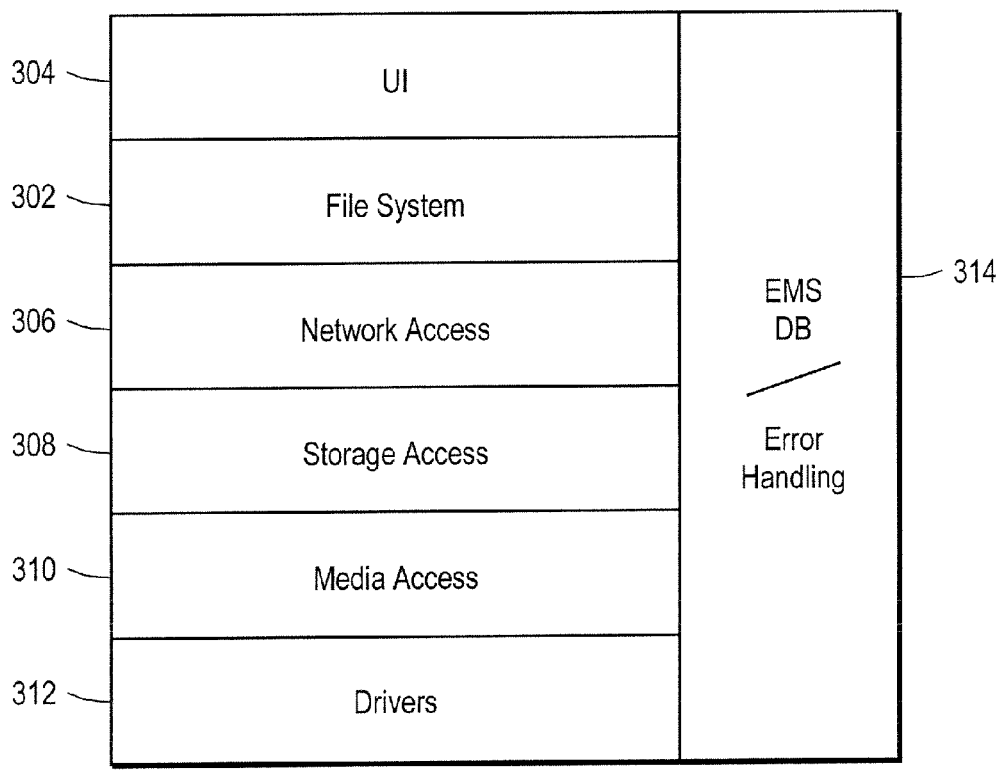
FIG. 3 illustrates the operating system of the appliance, according to certain embodiments of the invention.

FIG. 3 illustrates the operating system 110 of the appliance 108, according to certain embodiments of the invention. As can be seen, the operating system 110 includes a number of layers. The file system 302 executes read and write operations on the mass storage devices such as the drive 214 in response to client requests, maintains directories, etc. An example of a file system suitable for this purpose is the Write Anywhere File Layout (WAFL) file system from Network Appliance.

Above the file system 302, the operating system 110 also includes a user interface 304, through which a network administrator or other user can control and/or configure the appliance (e.g., remotely from a management station). The user interface 304 may generate a command line interface and/or a graphical user interface for this purpose.

Below the file system 302, the operating system 110 includes a network layer 306, a storage access layer 308, a media access layer 310, and a driver layer 312. The network access layer 306 implements any of various protocols used to communicate with client devices, such as network file system (NFS), common Internet file system (CIFS) and/or hypertext transport protocol (HTTP). The storage access layer 308 implements a disk storage protocol such as RAID, and may control the storage 214. The media access layer 310 includes one or more drivers which implemented the protocols used to communicate over the network, such as Ethernet. The driver layer 312 implements a lower-level storage device access protocol, such as Fibre Channel or SCSI.

An error handling component 314 including the EMS database 112 monitors the various components of the OS 110 to determine when an error occurs. When an error occurs, the error handling component 314 determines the type of error, and prepares an error package to send to the service provider 104. The error package includes the system logs, and other information that may be helpful in determining the nature of the error and possible corrective actions.

FIG. 4 illustrates an EMS event definition entry 400 according to an embodiment of the invention. The EMS event definition entry 400 includes several fields which describe an error and the handling of the error. The event definition entry 400 may describe a single error, and may be included among several other entries to comprise the EMS database 112.

The error definition 402 may be assigned a descriptive or other identifier, as can be seen in the error definition row 402. For example, the name of the error illustrated in FIG. 4 is "asup.general.drop." The row 402 also includes a definition of the severity of the error.

The error description row 404 lists a description of the error. The description can be used to identify the error when the error definition is unfamiliar to the user. The error description 404 may be detailed and may include a description of what caused the error.

The parameter row 406 includes a list of parameter that may be included when the error is reported to the computer system 102. For example, if the asup.general.drop error is reported to the computer system 102 in an autosupport package, the autosupport system 118 will input an autosupport message title to be included with the autosupport package. Other parameters may be included, and the data in the parameters may vary depending on the specific circumstances of the error.

The corrective action row 408 lists corresponding corrective actions for each type of error. It is understood that each error may include several different corrective actions. A single error may require different actions based on the circumstances of an error, or there may be several different alternative corrective methods for handling a single error. The corrective action row 408 may also include other information, such as source code for handling the error.

The syslog row 410 indicates that the event should result in a syslog message being generated, and indicates what the message should look like. The snmp row 412 indicates that a Simple Network Management Protocol (SNMP) trap should be generated, and describes the trap. The format column 414 indicates the format of the syslog or SNMP message to be sent. Other formats may also be used. For example, according to an alternate embodiment of the invention, Microsoft's Windows Event Viewer may be used.

According to one embodiment of the invention, the error definitions may be written by a developer using the Extensible Markup Language (XML). XML is a flexible language that allows a developer to easily manipulate the definitions. For example, the developer can translate an XML definition into source code, such as code in the C language, which can then easily be incorporated into the source code. In this way, XML serves as an event definition language, thereby automating the process of generating the error catalog.

It is understood that the illustrated EMS event definition 400 is simplified. The event definition 400 may include other information that the computer system 102 or the service provider 104 may find useful in diagnosing errors, such as systems affected, the incidence of the error, etc.

Figure 5:
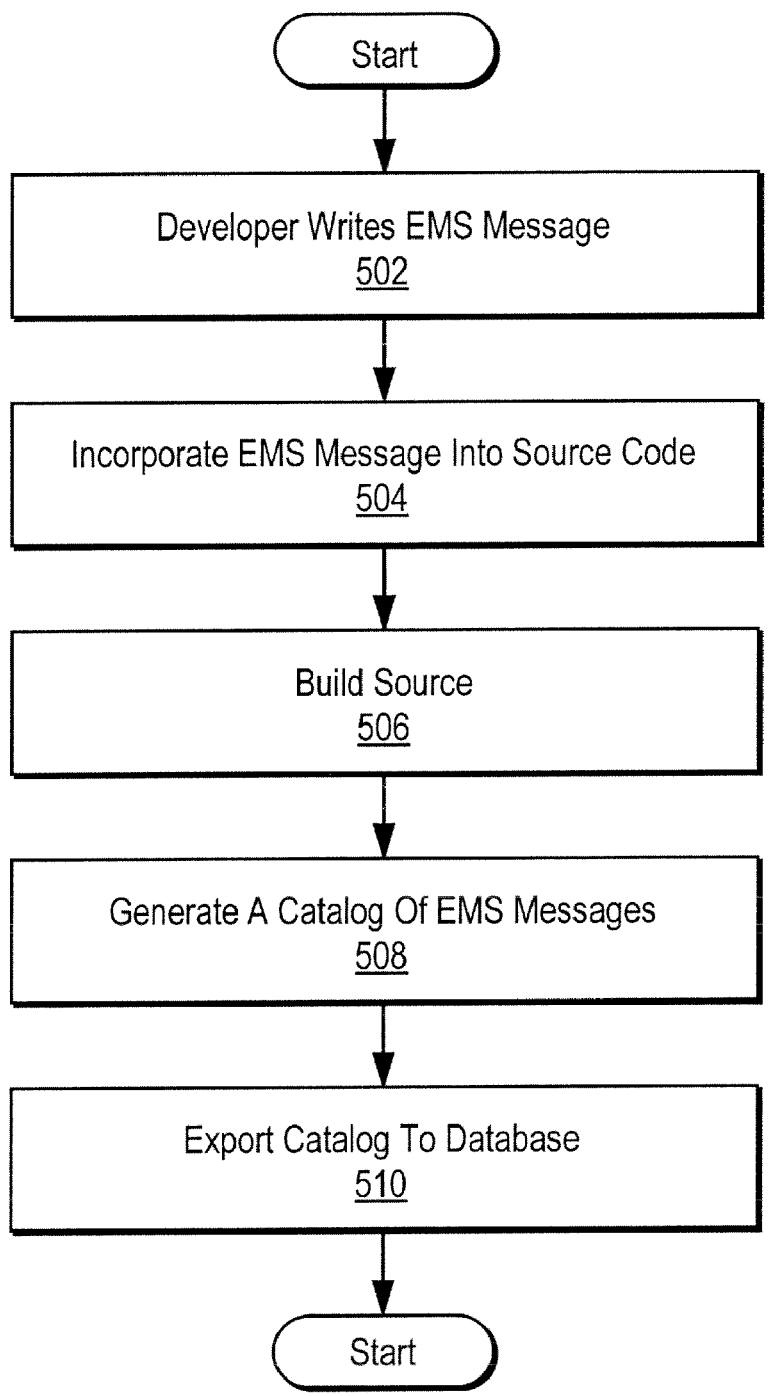
FIG. 5 is a flowchart illustrating a process for creating an EMS database in an operating system.
Figure 6:
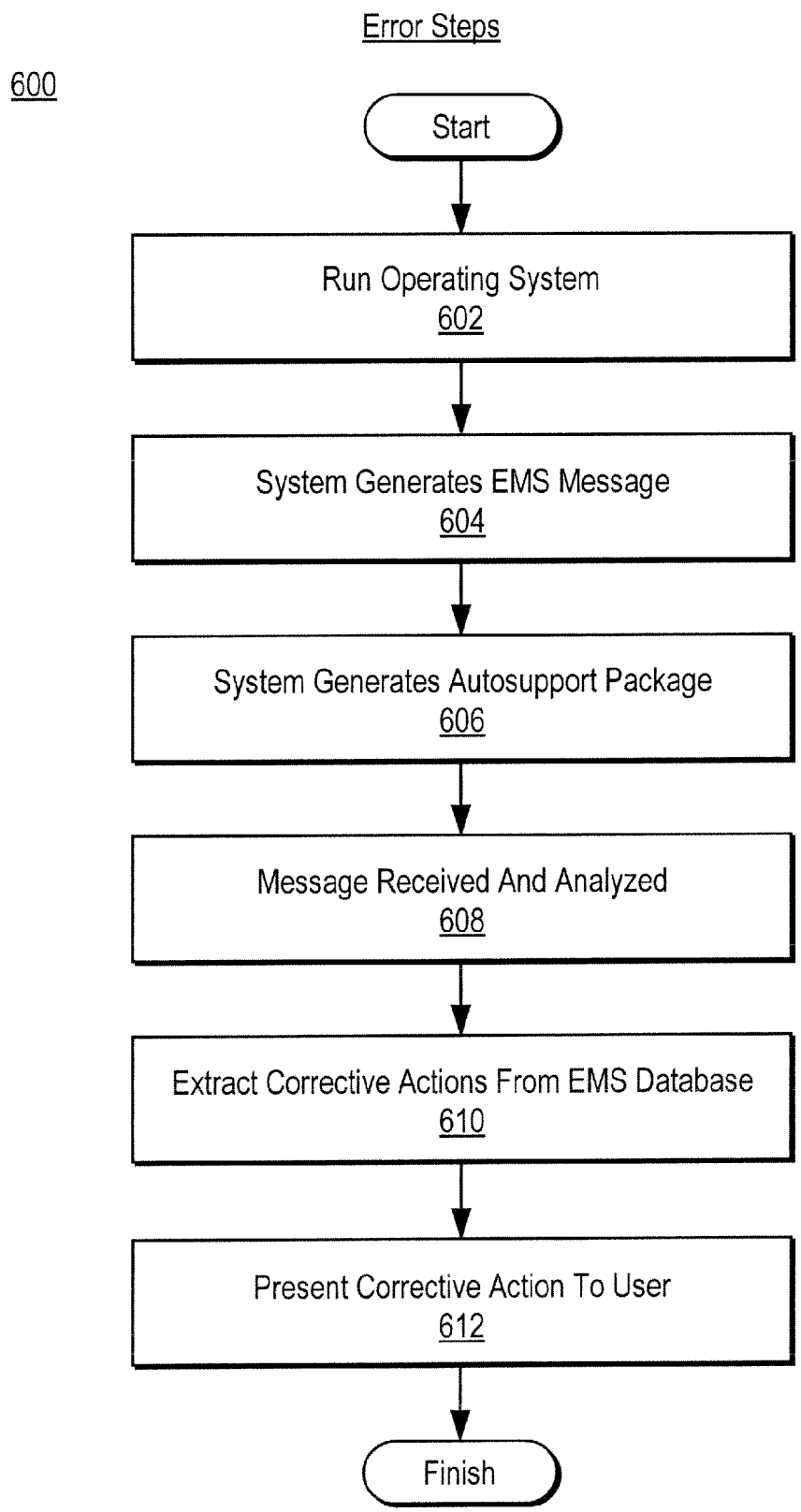
FIG. 6 is a flowchart illustrating the process of handling an error according to an embodiment of the invention.

FIGS. 5 and 6 detail processes for error handling according to an embodiment of the invention. The process 500 in FIG. 5 describes generating the error catalog and the EMS database 112 before the OS is shipped to the user. The process 600 of FIG. 6 describes the handling of an error event after it occurs.

FIG. 5 is a flowchart illustrating a process for creating an EMS database in an operating system. The OS may be the OS 110 described above in FIG. 3. The process 500 explains the generation of the EMS database 112 and the processing of the EMS database 112 before the OS 110 is built and delivered to a user. By generating the EMS database 112 in the OS code, the errors and their remedies are proactively determined, so that support may be easily furnished to a user upon occurrence of an error.

In block 502, a developer writes an EMS message. The EMS message may include several items of information, such a name of the error, a short description of the error, a detailed description of the error, and a list of potential remedies for the error. These items of information were described above regarding FIG. 4. The EMS message may be written using the XML language, as discussed above.

In block 504, the EMS message is incorporated into the source code for the operating system 110. The developer adds the description to a section of the OS's source code, so that the OS will have the EMS database 112 locally available. Again, the EMS message may be written in XML, which may make it easier to incorporate the EMS message into the OS's source code. In block 506, the OS source code is built. The process of building the source code generates an object code.

In block 508, a catalog of EMS messages is generated. XML definitions may make it easier for the error definitions to be imported into the EMS database 112. Using XML, each error message can be treated as a separate entity, which helps automate the process of generating the EMS database 112. For example, each definition can be converted into source code, such as code in the C language. The EMS database 112 can then be extracted from the code built in block 506.

In block 510, the catalog is exported to a database. The exported catalog may then be stored both on the user's computer system 102 and the remote support provider 104. At this point the EMS definitions have been generated and the OS 110 is ready for use. By incorporating the EMS definitions into the source code for the OS 110, those error definitions are always available to the OS 110. The definitions may also be loaded into a persistent or volatile memory device (e.g., a disk device or memory) that is accessible by the OS 110.

FIG. 6 is a flowchart illustrating the process 600 of handling an error according to an embodiment of the invention. The process 600 may be started in response to an autosupport request as described above. Generally, the service provider 104 will receive the error package in the autosupport request, unbundle the package, examine the logs and consult the EMS database 112, and then analyze the error and return an autosupport package to the computer system 102. In this way, the corrective action is automatically presented to a user, thereby streamlining the error handling process.

In block 602, the OS 110 is run by a user. In block 604, the system 102 generates an EMS message as a result of the initiation of autosupport on the system 102. As described above, autosupport may be activated in response to a number of events, including an error that occurred on the system 102. The EMS message can be imported from the EMS database 112 embedded in the OS 110. The system 102 generates an error package including the EMS database 112 and the system logs.

In block 606, an autosupport package is generated by the service provider 104. The autosupport package includes an annotated system log included the error definitions and descriptions. The autosupport package further causes the computer system 102 to automatically prompt the user of the computer system 102 to take the suggested corrective action. According to one embodiment of the invention, depending on the corrective action required, the autosupport package may include instructions to automatically repair the error, without user intervention.

In block 608, the autosupport message is received and analyzed by the computer system 102. The autosupport message may be handled by the error handling unit 314 of the OS 110. The computer system 102 analyzes the autosupport package and determines the nature of the error that occurred. In block 610, the corrective action for the error is extracted from the EMS database 112. Finally, in block 612, the corrective action is presented to the user. Upon occurrence of a system error, the user is automatically prompted with the corrective action, at which point the user may decide whether or not to take the suggested action.

By automatically prompting the user with a corrective action in response to the occurrence of an error, the error handling process is significantly streamlined. The user is no longer required to analyze bare system logs and determine errors by consulting manuals or websites. The user can now decide whether to follow the advice given by the autosupport system 118, and can choose to correct an error when the solution is presented to him.

While the embodiments described herein are discussed in terms of an operating system, other embodiments of the invention may embed an error catalog into other computer executable environments including flash memories, ROM, application software, libraries, and machine-independent virtual machines (e.g., Java Virtual Machine).

This invention has been described with reference to specific exemplary embodiments thereof. It will, however, be evident to persons having the benefit of this disclosure that various modifications changes may be made to these embodiments without departing from the broader spirit and scope of the invention. The specification and drawings are accordingly to be regarded in an illustrative rather than in a restrictive sense.

What is claimed is:

1. A method for handling errors on a remote computer system comprising:
    generating an error message definition and incorporating the definition into a source code of an operating system for a computer system;
    generating a catalog of error messages and exporting the catalog to a database;
    receiving a packaged data message including a system log from the computer system;
    analyzing the message to determine a corrective action; and
    issuing a response to the computer system containing the error message definition and the corrective action, and transmitting a support package to the computer system including an annotated system log.

2. The method of claim 1, wherein generating the error message definition comprises generating the error message definition using an Extensible Markup Language (XML).

3. The method of claim 1, further comprising providing the error message definition and corrective action to a user of the computer system and prompting for a manual response from the user.

4. An apparatus comprising:
    a server to receive an error package from a computer system over a network and to transmit a support package to the computer system over the network;
    a scripting server coupled to the server to unbundle the error package and analyze a system log included in the error package, and to generate the support package including a corrective action and an annotated system log; and
    a database coupled to the scripting server to store a copy of the support package.

5. The apparatus of claim 4, further comprising:
    a customer support database to store a history of errors on the computer system.

6. The apparatus of claim 4, wherein the server comprises a web server.

7. The apparatus of claim 4, wherein the server comprises a mail server.

8. The apparatus of claim 4, wherein the corrective action is prompted to a user of the computer system.

9. A method of operating a network storage appliance, the method comprising:
    detecting occurrence of an error in the network storage appliance;
    accessing an event management system (EMS) database which is incorporated within code of an operating system of the network storage appliance, the EMS database including a plurality of records, each including information descriptive of a type of error that can occur in the network storage appliance;
    generating an error package in response to the error, based on a record in the EMS database;
    transmitting the error package to a remote entity over a network, the error package including a system log of the network storage appliance;
    receiving an autosupport package from the remote entity over the network in response to the error package, the autosupport package including an annotated version of the system log; and
    using the autosupport package to identify a corrective action for the error.

10. A method as recited in claim 9, wherein the EMS database is expressed in an Extensible Markup Language (XML).

11. A method as recited in claim 9, wherein said record in the EMS database includes an indication of the corrective action.

12. A method as recited in claim 11, wherein the autosupport package causes the network storage appliance to locate said indication of the recommended corrective action in said record.

13. A method as recited in claim 9, wherein the autosupport package includes an indication of the corrective action.

14. A network storage appliance comprising:
    a processor;
    a network adapter through which to communicate over a network;
    a storage adapter through which to access an external storage facility; and
    memory storing an operating system of the network storage appliance, the operating system including
        an event management system (EMS) database, the EMS database including a plurality of records, each including information descriptive of a type of error that can occur in the network storage appliance, and
        an error handling module to detect occurrence of an error in the network storage appliance; to access the EMS database and generate an error package in response to the error based on a record in the EMS database, the error package including a system log of the network storage appliance; to transmit the error package to a remote autosupport system over a network; to receive an autosupport package from the remote autosupport system over the network, the autosupport package including an annotated version of the system log; and to use the autosupport package to identify a corrective action for the error.

15. A network storage appliance as recited in claim 14, wherein the EMS database is expressed in an Extensible Markup Language (XML).

16. A network storage appliance as recited in claim 15, wherein said record in the EMS database includes an indication of the corrective action.

17. A network storage appliance as recited in claim 16, wherein the autosupport package causes the network storage appliance to locate said indication of the recommended corrective action in said record.

18. A network storage appliance as recited in claim 15, wherein the autosupport package includes an indication of the corrective action.

19. A method comprising:
    incorporating an event management system (EMS) database into code of an operating system of a network storage appliance, the EMS database including a plurality of records, each including information descriptive of a type of error that can occur in the network storage appliance;
    receiving an error package from the network storage appliance over a network after an error occurs in the network storage appliance, the error package generated by the network storage appliance in response to said error, based on a record in the EMS database, the error package including a system log of the network storage appliance;
    performing an analysis of information in the error package;
    automatically generating an autosupport package based on a result of the analysis, the autosupport package including an annotated version of the system log; and
    transmitting the autosupport package to the network storage appliance over the network.

20. A method as recited in claim 19, wherein the EMS database is expressed in an Extensible Markup Language (XML).

21. A method as recited in claim 19, wherein the EMS database includes an indication of a corrective action for said error in a record corresponding to said error.

22. A method as recited in claim 21, wherein the autosupport package causes the network storage appliance to locate said indication of the corrective action in said record.

23. A method as recited in claim 19, further comprising:
    comparing information in the error message to a local copy of the EMS database;
    wherein said generating an autosupport package is based on an outcome of said comparing.

24. A method as recited in claim 19, wherein the autosupport package includes an indication of a corrective action for said error.

* * * * *